Feb. 24, 1942.   C. P. GALANOT ET AL   2,273,950
TRACTION DEVICE
Filed May 14, 1940   3 Sheets-Sheet 1
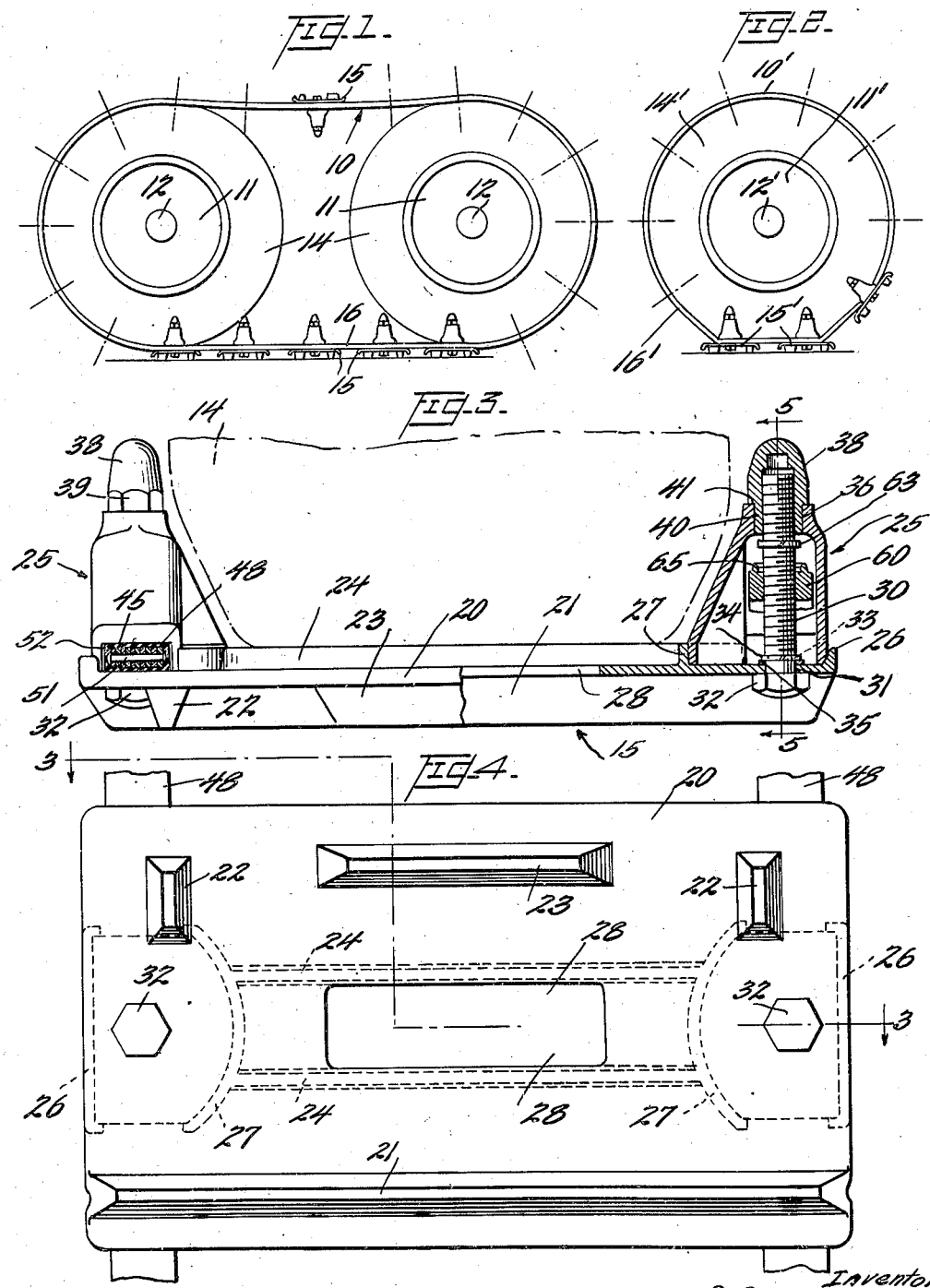

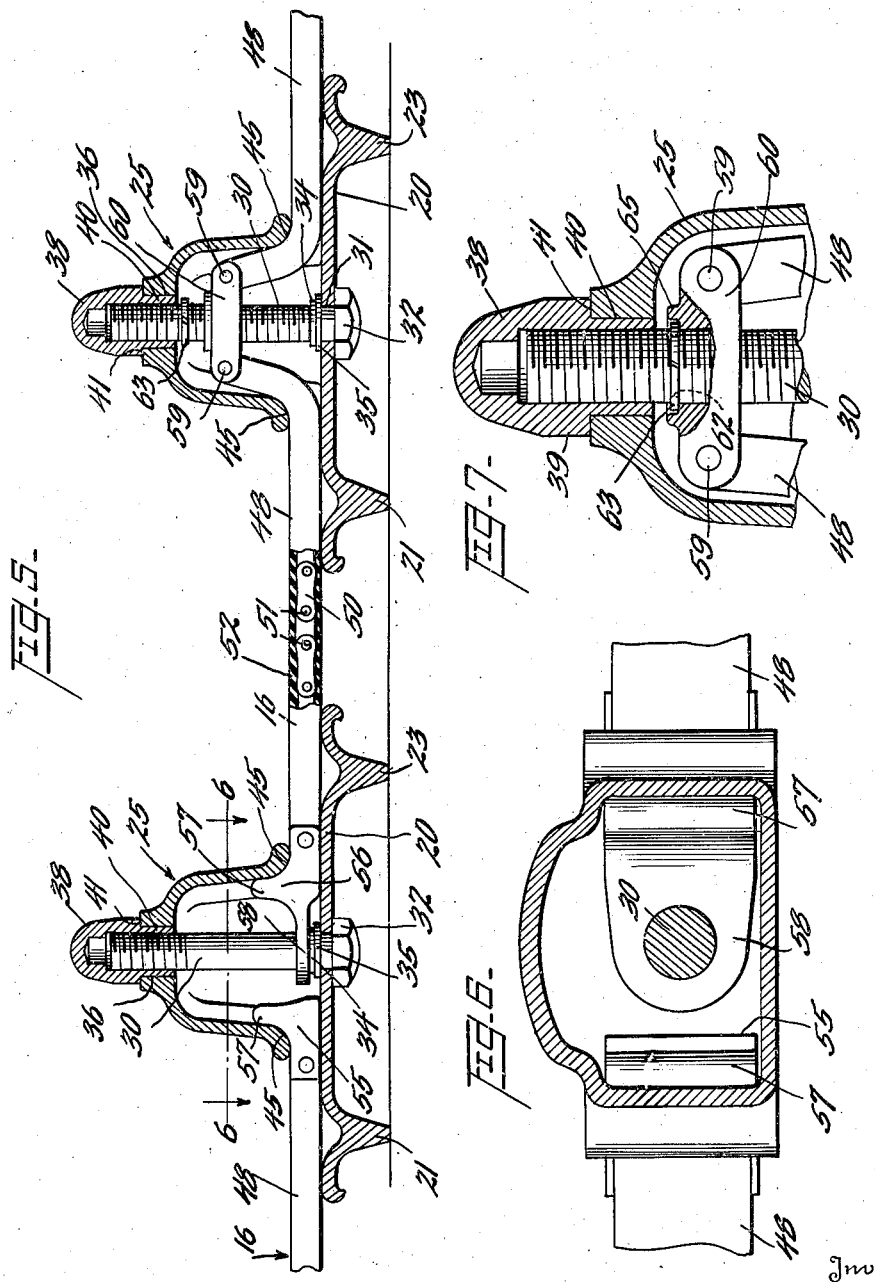

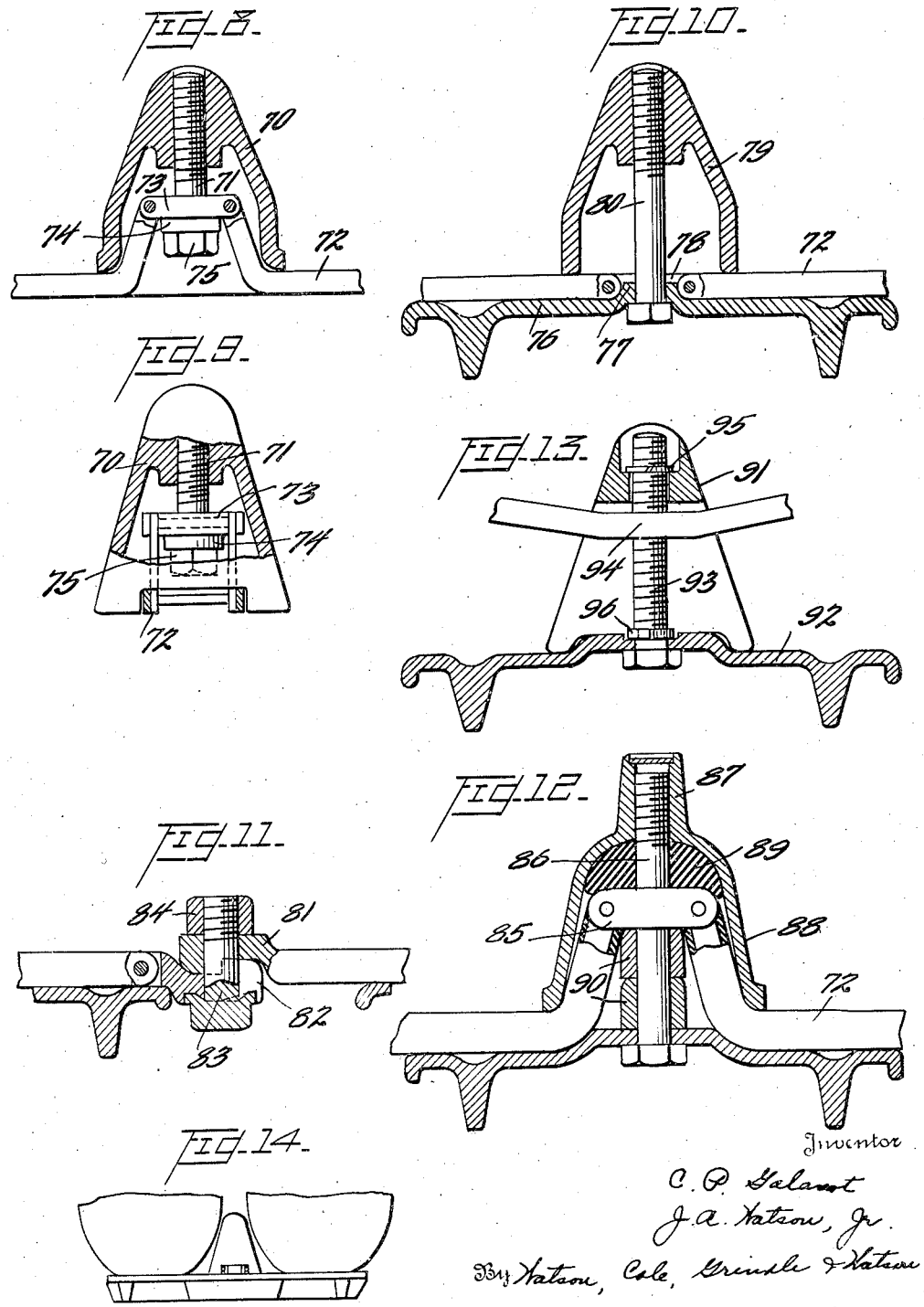

Patented Feb. 24, 1942

2,273,950

UNITED STATES PATENT OFFICE 2,273,950

TRACTION DEVICE

Camille P. Galanot, Alliance, Ohio, and James A. Watson, Jr., Silver Spring, Md.

Application May 14, 1940, Serial No. 335,124

14 Claims. (Cl. 305—10)

This invention relates to traction devices and more particularly to belt traction devices applicable to either single or tandem vehicle wheels, of either the single or the dual tire type.

The principal object of the invention is to provide a novel and improved traction device of the same general character as those described in our Patent No. 2,171,547, granted September 5, 1939, and our copending application Serial No. 241,446, filed November 19, 1938, but embodying features of construction which particularly adapt it for use in connection with single or tandem wheels of the single as well as the dual tire type.

Numerous advantages which accrue from the use of those prior devices, and which have been fully described in the patents referred to, are also appurtenant to the present invention. Among these advantages may be mentioned the following. The traction devices are light in weight, well balanced, easy to handle and install quickly, and capable of high road speed, while at the same time being rugged and sturdy in construction and not liable to get out of order nor to deteriorate rapidly on account of excessive wear. The traction shoes are self-cleaning and are adapted to provide increased flotation as well as greater traction. Wide ranges of adjustment of the belts are provided for, so that the same device may be fitted to tires of different sizes, and these adjustments may be readily made even though the wheel and track may be nearly buried in mud. Friction means are provided on the tire sides of the shoes for preventing relative rotation of the wheel and the traction device, even though varying degrees of tightness of adjustment are maintained. The belts or tracks may be made in sections each comprising a plurality of traction shoes so that adjustment, repair, and replacement are facilitated.

In addition to these general features, it is the object of the present invention to provide specific improvements in the means for securing the track units in place in the traction device, and in the means for adjusting the length of the same. It is also an object of the invention to provide a novel arrangement of connecting belts and guide elements for the device which is more particularly adapted for application to single tire wheels. A further object of the invention relates to the provision of improvements in the self-cleaning feature of the traction shoes.

Other objects and features of novelty will be apparent from the following specification when read in connection with the accompanying drawings in which one embodiment of the invention is illustrated by way of example.

In the drawings:

Figure 1 is a somewhat diagrammatic view in side elevation of a traction device embodying the principles of the present invention as applied to vehicles having tandem axles;

Figure 2 is a similar view of a traction device according to the invention as applied to a single wheel;

Figure 3 is a transverse offset sectional view through a portion of the traction device, the left half of the view being taken through the flexible connector belt between the traction shoes and the right half being taken through the center of one of the traction plates, substantially as on line 3—3 of Figure 4;

Figure 4 is a bottom plan view of one of the traction shoes;

Figure 5 is a vertical longitudinal sectional view through a portion of the traction device adjacent one margin thereof and taken on line 5—5 of Figure 3;

Figure 6 is a fragmentary horizontal sectional view on an enlarged scale taken substantially on line 6—6 of Figure 5;

Figure 7 is an enlarged fragmentary vertical sectional view of a portion of an adjusting unit of the traction device;

Figures 8 and 9 are detail views illustrating a modification in which adjusting means are provided intermediate the traction shoes;

Figure 10 is a longitudinal vertical section illustrating a shoe and guide unit adapted for use in conjunction with the adjusting means of Figures 8 and 9;

Figure 11 illustrates a connecting means adapted for use in conjunction with the modification of Figures 8-10;

Figures 12 and 13 are longitudinal vertical sections illustrating further modifications of the adjusting means; and Figure 14 is a transverse section illustrating the application of a traction device according to the present invention to a dual tire wheel.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

In Figure 1 of the drawings, there is shown a belt traction device designated generally by the numeral 10 which is applied to the aligned wheels 11 of the tandem axles 12, the wheels being provided with the pneumatic tires 14. The traction device comprises the endless series of shoes 15 which are secured at intervals to the sectional endless belt 16. Preferably there are three or four adjacent shoes carried by each section of the endless belt 16 and one or more sections may be omitted in reducing the length of the traction device as for application to a single wheel such as illustrated in Figure 2 of the drawings at 11'. This wheel is carried by an axle 12' and is provided with a pneumatic tire 14'. The shortened traction device 10' with fewer shoes 15' is adapted to fit snugly around the single wheel, and a fine adjustment for adapting the device to wheels of different sizes and types may be made by a further shortening of the belt 16 or 16' by means which will presently be described. Also, by combining sections having three/or four shoes, it is apparent that a belt having any desired number of shoes in excess of five may be readily assembled.

As more clearly illustrated in Figures 3, 4 and 5 of the drawings, each traction shoe unit comprises a plate 20 which is preferably of forged steel and is provided with an arrangement of cleats on the outer surface thereof such as clearly indicated at 21, 22 and 23 in Figure 4. The inner surface of the plate which is adapted to contact the tire 14 is provided with the parallel transverse cleats 24 which serve to grip the tire and prevent the wheel spinning within the traction device. Between the two cleats 24 and substantially centrally of the plate 20 is the rectangular opening 28 through which mud may pass and thus render the shoe self-cleaning.

In order to guide the successive traction shoes around the periphery of the tires and prevent lateral displacement, each of the shoes 15 is provided with transversely spaced guide elements 25 which are secured to the plates 20 at their side margins and project radially inwardly of the device to embrace the lateral periphery of the tire 14. The guide members 25 are of a hollow dome-like configuration and the inner faces thereof are smoothly shaped to conform generally to the outline of the tire so as to provide no sharp edges which would cause excessive wear and shortly ruin the tire.

The open lower end of each of the guide members 25 is received within the raised outer and inner ribs 26 and 27 formed on the inner surface of the plate 15 and the members 25 are secured to the respective plates by means of the bolts 30 which are rotatably received within openings 31 in the plates 15. The head 32 of each bolt 30 is adapted to seat against the outer surface of the plate 20, and at a point spaced along the shank of the bolt from the head there is provided an annular groove 33 within which is snapped a split stop washer 34, and between this washer 34 and the inner face of the plate 20 there is interposed a washer 35. It will thus be seen that the bolt is freely rotatable with respect to the plate 20 unless prevented by other means than the bolt and plate themselves.

The threaded opposite end of the bolt 30 extends with considerable clearance through the opening 36 in the upper end of the member 25 as viewed in Figure 3 of the drawings and a cap nut 38 is threaded upon the end of the bolt. The cap nut 38 is of a smooth rounded configuration conforming generally to the conical or dome-like shape of the member 25, but is provided with a hexagonal portion 39 for the application of a wrench during adjustment of the device. An annular narrowed portion 40 of the cap nut 38 extends within the opening 36 in the upper end of the member 25 and a shoulder 41 seats upon the outer end of the member 25. It will be seen from this that when the cap nut 38 is screwed down tightly upon the bolt 30, it will clamp the member 25 rigidly in position against the inner side of the plate 20.

Each of the guide members 25 is provided with aligned notches or slots 45 in their lower ends which provide a space, between the margins of these notches and the inner surface of the plate 20, for the admission of the flexible connecting elements forming the belt 16. As clearly shown in Figures 3, 4 and 5 of the drawings the connecting belt 16 comprise a series of parallel sections 48 each of which carries a plurality of the traction shoe units 15. These flexible connecting elements may be in the form of chains comprising the links 50 connected by the transverse pins 51 or rivets 51 and covered with rubber as indicated at 52, or may be steel cables or other substantially non-stretchable, flexible connecting elements.

Certain of the traction shoes 15 are disposed at the ends of the belt units 48 and embody means for securing the adjacent ends of the belt units together to form a continuous endless device. Others of the shoes 15 are carried intermediate the ends of the belt units 48 and one of such shoes is shown at the right hand side of Figure 5 of the drawings. These intermediate units embody means for adjusting the length of the device by forming bights in the belt sections 48 within the guide members 25 positioned at each side of the shoe.

Referring again to the end units of the separable sections of the traction device it will be seen at the left hand side of Figure 5 that the adjacent belt sections 48 are provided with enlargements 55 and 56, these enlargements having upwardly projecting tongues 57 which prevent the withdrawal of the flexible elements from the notches or slots 45 at either end of the guide element 25. One of the enlargements, that designated 56, is provided with a perforated extension 58 which embraces the bolt 30 and thus is relatively permanently secured to that particular shoe 15. In order to disconnect the adjacent sections of the traction device the nut 38 is backed off of the bolt 30 for a sufficient number of turns so that the guide member 25 may be raised for a distance which will allow the enlarged end 55 of the flexible connecting element to be withdrawn from the slot 45. During this operation the end enlargement 56 of the adjacent section 48 will be retained within the guide element 25 by means of the connection 58 which surrounds the bolt 30.

The devices associated with the intermediate shoes 15 of the separable sections of the traction device, which serve to vary the length and fit of the sections will now be described with reference to Figure 7 and the right hand side of Figure 5. The chains forming the section 48 pass through the slots or notches 45 in the member 25 just as in the case of the end elements and within the member 45 the chains are divided and each end pivotally connected as at 59 with the adjusting block 60 which is threaded upon the bolt 30. It will be obvious that when the cap or lock nut 38 is backed off of the end of the bolt 30, the bolt may be rotated by applying a suitable tool to the head 32 thereof, and the block or rider 60 moved either upwardly or downwardly upon the shank of the bolt in order to lengthen or shorten the bight formed in the chain section 48 within the guide member 25. In this way a wide range of adjustments of the length of the traction device to fit tires of different sizes may be attained.

At a point on the shank of the bolt 30 spaced a short distance from the inner side of the upper wall of the member 25, there is formed a notch or groove 62 within which there is snapped a split ring or washer 63 which serves as a stop abutment for limiting the upward movement of the block 60. In order to prevent the dislodgment of this split ring from the groove by the block 60, an annular boss or ridge 65 is formed upon the upper side of the block 60 which closely embraces the ring 63 and effectively prevents its expansion and dislodgment from the shank of the bolt. It will be noted that the same thread on the bolt 30 serves for engagement with the block 60 and the lock nut 38.

It is not essential that the guide members associated with the shoes shall be utilized for adjusting purposes, but means may be provided intermediate the shoes for this purpose. Thus, the adjusting device of Figures 8 and 9 comprises a cupped member 70 of generally conical form, the apertured nose portion thereof being internally threaded to receive a bolt 71. The connecting member or belt 72 is provided with an apertured block 73 through which the bolt 71 extends, a washer 74 being interposed between the link 73 and the head 75 of the bolt. Lower opposed edges of the cupped member 70 are recessed, as seen in Figure 9, to receive the belt 72 and prevent rotation of the member 70 relative thereto.

In the use of the adjusting means of Figures 8 and 9, as in the previous case, adjustment is made by varying the bight taken in the belt 72, by rotating the bolt 71 relative to the member 70.

If adjusting means are provided intermediate the shoe units, the latter may comprise a simple shoe and guide combination as illustrated in Figure 10, in which no adjusting or connecting means are employed. The shoe 76 is provided with a boss 77 on its upper surface, for engaging a suitably recessed block 78 of the belt 72. A cupped guide member 79, which may be similar to the member 70 of Figure 8, is secured by means of a bolt 80, and serves both as a guide and as means clamping the belt 72 firmly against the shoe 76, thus preventing slippage of the shoe relative to the belt.

The connecting means of Figure 11 may be employed for joining sections of belt intermediate the shoes, when shoes of the type illustrated in Figure 10 are used. In this case, the joining ends of adjacent belt sections are provided with apertured, undercut hook members 81, 82, which are adapted to interlock, being secured in this relation by a bolt 83 and nut 84. No provision is made for adjustment of the length of the belt at this point, it being preferred to effect this adjustment by the means previously described.

Figure 12 illustrates a further adjusting means which is especially suitable for making the initial adjustment, although it may also be used for adjusting the device in the field. In this case the belt is provided with an apertured block 85 through which the bolt 86 extends and has threaded engagement with the boss 87 of the guide 88. A cushion member 89 surrounds the bolt above the block 85, and in the illustrated condition, a pair of apertured selector blocks 90 encircle the bolt between the block 85 and the shoe. Adjustment of the bight taken in the belt 72 is made by removing the bolt and disposing one or both of the selector blocks above or below the block 85, as desired, the bolt then being replaced and tightened to bring the guide 88 into firm engagement with the belt 72 and the shoe.

Figure 13 illustrates a further modified adjusting means which, while utilizing the same principle of adjustment as the previous forms, makes a slightly different application of the principle. In this modification, the fore and aft walls of the guide 91 are left open, the lateral walls extending into engagement with the shoe 92 as shown. A bolt 93 extends through the shoe 92 and has threaded engagement with the block 94 of the belt 72. The end of the bolt extends loosely through the nose of the guide 91 and is secured in place by a snap washer 95. Preferably a second snap washer 96 encircles the bolt above the shoe 92, thus retaining the bolt, shoe and guide in fixed relation, the bolt nevertheless being rotatable relative to the shoe and guide.

In using the present form of adjusting means for tightening the traction device about a wheel or pair of wheels, the bolt 93 is rotated so as to exert an outward or downward (in Fig. 13) pull upon the belt, thus increasing the tension in the belt and the reaction force urging the shoe 92 into firmer engagement with the tire (not shown). In effecting this action the belt is of course deflected from its natural or unstressed curvature or position, just as in the previous modifications. However, in the previous forms of adjusting means, the shortening (and thus the tension) of the belt is enhanced by deflecting the belt into a cupped member having relatively closely spaced walls, whereby the bight taken in the belt is emphasized. In the present form, the fore and aft walls of the guide 91, instead of being left entirely open, may be formed with windows through which the flexible belt extends, the walls extending across beneath the windows. In this case, after the block 94 has travelled downward a certain distance relative to the bolt, the belt will be forced downwardly between the lower portions of the fore and aft walls of the guide, thus emphasizing the bight and increasing the amount of shortening achieved for each increment of downward movement of the block 94.

The important principle which is applied by all of the described adjusting means is that of increasing the tension in the connecting belt, and thus the reaction of the shoes against the tires, by exerting a force transverse to the length of the belt, rather than tangential thereto. This mode of applying the tightening effort has an important advantage in that it renders unnecessary the use of turnbuckles or similar devices involving threaded engagement between members in tension. It has been found that such devices are unsatisfactory for the reason that the threads become deformed due to the large forces acting directly upon them. Other devices for shortening the connecting member by a direct tangential pull are difficult to manipulate due to the relatively high force required for their actuation. A further disadvantage of such devices is that they can only operate upon separated ends of the connecting member, whereas the connecting belt of the present device, once it is assembled, remains intact and continuous.

A further advantage of adjusting by means of a transversely applied force is that the manually operable member (bolt) of the adjusting means may have its tool-receiving portion (head) disposed outwardly of the structure, so as to be readily accessible at all times. That is, at least some of the adjusting means may be actuated even though the wheels of the vehicle are nearly completely buried in mud, sand or snow, since the heads of the adjusting bolts are exposed on the outer or ground-engaging side of the device, and at least those on the upper side of the wheel or wheels will be accessible at all times.

It is obvious that the adjusting principle of the present invention may be applied by means of devices for exerting a lateral, rather than radial, force for deflecting the connecting member, the latter, in such case, being formed so as to be laterally flexible. However, the radial method is preferred since it provides for greater accessibility of the actuating members, as well as greater simplicity of design.

It is likewise obvious that the connecting means of Figure 11 and the simple shoe and guide unit of Figure 10 may be used in conjunction with any of the disclosed adjusting means, as well as that of Figures 8 and 9. For example, the connecting means of Figure 11 may be used in place of the connecting shoe unit of Figure 5, although the adjusting shoe unit of Figure 5 may be employed rather than the separate adjusting means of Figure 8.

All of the devices illustrated and described may be readily adapted for use with dual rather than single wheels, as shown in Figure 14, by disposing a single guide centrally of the shoe and employing a single connecting member instead of two. In such case the shoes are of course made sufficiently wide to bridge the two tires of the wheel or wheels on which the device is applied.

Having thus described the invention, what is claimed as new and desired to be secured by Letters Patent is:

1. A traction device for attachment to a vehicle wheel having a resilient tire and comprising a series of spaced traction shoes adapted to make frictional driving engagement with said tire, flexible, substantially non-stretchable means connecting said shoes into an endless chain-like structure, tire-engaging means for guiding said structure, adjusting means exerting a force acting transversely on said connecting means whereby the tension of the latter is increased to maintain said traction shoes in firm engagement with the associated tire, said last means comprising a hollow cupped member extending inwardly of the periphery of the tire and adapted to receive a bight of said connecting means, and manually operable means associated with said cupped member for deflecting a portion of said connecting means thereinto.

2. A traction device for attachment to a vehicle wheel having a resilient tire and comprising a series of spaced traction shoes adapted to make frictional driving engagement with said tire, flexible, substantially non-stretchable means connecting said shoes into an endless chain-like structure, and adjusting means exerting a force acting transversely on said connecting means whereby the tension of the latter is increased to maintain said traction shoes in firm engagement with the associated tire, said last means comprising a hollow cupped member adapted to receive a bight of said connecting means, and manually operable means associated with said cupped member for deflecting a portion of said connecting means thereinto, said cupped member being associated with a traction shoe and serving to guide the latter relative to the associated tire.

3. A traction device for attachment to a vehicle wheel having a resilient tire and comprising a series of spaced traction shoes adapted to make frictional driving engagement with said tire, flexible, substantially non-stretchable means connecting said shoes into an endless chain-like structure, and adjusting means exerting a force acting transversely on said connecting means whereby the tension of the latter is increased to maintain said traction shoes in firm engagement with the associated tire, said last means comprising a guide member associated with one of said shoes and having a passage therethrough for said connecting means, and a member associated with said guide member and said shoe and engaging said connecting means, said last member being manually operable for exerting said force on said connecting means.

4. A traction device for attachment to a vehicle wheel having a resilient tire and comprising a series of spaced traction shoes adapted to make frictional driving engagement with said tire, each said traction shoe comprising a plate portion having a hollow guide member secured thereto, and flexible, substantially non-stretchable means connecting said shoes into a continuous chain-like structure, and means associated with a plurality of said guide members for deflecting corresponding portions of said connecting means thereinto to form a plurality of bights in said connecting means.

5. A traction device for attachment to a vehicle wheel having a resilient tire and comprising a series of spaced traction shoes adapted to make frictional driving engagement with said tire, flexible, substantially non-stretchable means connecting said shoes into a continuous, chain-like structure, and a plurality of spaced adjusting means, each said adjusting means comprising a hollow cupped member extending inwardly of the periphery of the tire and adapted to receive a bight of said connecting means, and manually operable means associated with said cupped member for deflecting a portion of said connecting means thereinto.

6. A traction device for attachment to a vehicle wheel, having a resilient tire, said device comprising a series of spaced traction shoes each comprising a plate portion and a pair of laterally spaced hollow guide portions adapted to embrace the respective side portions of said tire, and a series of pairs of parallel flexible connecting members each mounting at least two of said traction shoes, the adjacent ends of said pairs of members being connected together within the hollow guide portions of certain of said shoes.

7. A traction device for attachment to a vehicle wheel having a resilient tire, said device comprising a series of spaced traction shoes each comprising a plate portion having a hollow radially projecting guide member secured adjacent each side margin thereof and adapted to smoothly fit about the contour of the edges of the periphery of said tire, and a series of pairs of parallel flexible connecting members each mounting at least one shoe intermediate its ends, and means associated with said hollow guide members for deflecting a portion of said flexible member thereinto.

8. A traction device for attachment to a vehicle wheel having a resilient tire, said device comprising a series of spaced traction shoes each comprising a plate portion having a hollow radially projecting guide member secured adjacent each side margin thereof and adapted to smoothly fit about the contour of the edges of the periphery of said tire, and a series of pairs of parallel flexible connecting members each mounting at least two shoes, means associated with certain of said hollow guide members for deflecting a portion of said flexible member thereinto, and means associated with other of said guide members for connecting adjacent ends of said pairs of flexible members together.

9. A traction device for attachment to vehicle wheels, said device comprising a series of spaced traction shoes, each comprising a plate provided with laterally spaced guide members for embracing the periphery of the wheel, a pair of parallel flexible members connecting adjacent shoes, and means associated with said guide members for adjusting the length of said respective connecting members.

10. A traction device for attachment to a vehicle wheel having a resilient tire, comprising a series of spaced traction shoes adapted to make frictional driving engagement with said tire, flexible, substantially non-stretchable means connecting said shoes into an endless chain-like structure, tire engaging means for guiding such structure, and adjusting means for varying the effective length of said connecting means, said adjusting means comprising a member secured to said connecting means, and means for positively moving said member in either direction in a path transverse to the length of said connecting means.

11. A traction device for attachment to a vehicle wheel having a resilient tire and comprising a series of spaced traction shoes adapted to make frictional driving engagement with said tire, flexible, substantially non-stretchable means connecting said shoes into an endless chain-like structure, and means for longitudinally contracting said traction device by deflecting a portion of said connecting means to form a bight, said means for deflecting said connecting means comprising a member secured to said connecting means, and means for positively moving said member in either direction in a path transverse to the length of said connecting means.

12. A traction device for attachment to a vehicle wheel having a resilient tire, comprising a series of spaced traction shoes adapted to make frictional driving engagement with said tire, flexible, substantially non-stretchable means connecting said shoes into an endless chain-like structure, and adjusting means for varying the effective length of said traction device, said adjusting means comprising a member secured to said connecting means, and means for positively moving said member in either direction in a path extending radially of said wheel.

13. A traction device for attachment to a vehicle wheel having a resilient tire, comprising a plurality of traction shoes adapted to make frictional driving engagement with said tire, means connecting said shoes into a continuous chain-like structure, and adjusting means associated with said connecting means for varying the effective length of said traction device, said adjusting means comprising a member secured to said connecting means, and means for positively moving said member in either direction in a path transverse to the length of said connecting means, including a manually operable member having a tool-engaging portion accessible from the ground-engaging side of said structure.

14. A traction device for attachment to a vehicle wheel having a resilient tire, comprising a plurality of traction shoes adapted to make frictional driving engagement with said tire, means connecting said shoes into a continuous chain-like structure, and a plurality of spaced adjusting means, each said adjusting means comprising a member secured to said connecting means, and means for positively moving said member in either direction in a path transverse to the length of said connecting means, whereby the tension of the latter is increased to maintain said traction shoes in firm engagement with the associated tire.

CAMILLE P. GALANOT.
JAMES A. WATSON, Jr.